(12) United States Patent  
Lyon et al.

(10) Patent No.: US 7,288,029 B1
(45) Date of Patent: Oct. 30, 2007

(54) PROPSHAFT WITH CRASH-WORTHINESS

(75) Inventors: James Lyon, Northampton (GB); Mark Nicholls, Burntwood (GB); David Sasseen, Allenton, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 277 days.

(21) Appl. No.: 11/039,525

(22) Filed: Jan. 19, 2005

(51) Int. Cl.
*F16C 3/03* (2006.01)

(52) U.S. Cl. .................... 464/162; 403/359.6

(58) Field of Classification Search ............ 464/162, 464/167, 163, 164, 169; 280/777; 403/359.6, 403/359.1–359; 74/492
See application file for complete search history.

(56) References Cited

U.S. PATENT DOCUMENTS

| | | | |
|---|---|---|---|
| 2,988,805 A | 6/1961 | Thompson | |
| 3,486,396 A * | 12/1969 | Yoshioka et al. | 74/492 |
| 3,504,568 A * | 4/1970 | Nakamura et al. | 74/492 |
| 3,517,953 A * | 6/1970 | Wright et al. | 403/359.3 X |
| 3,696,638 A | 10/1972 | Smith et al. | |
| 3,717,046 A * | 2/1973 | Takao et al. | 74/492 |
| 5,118,214 A | 6/1992 | Petrzelka et al. | |
| 5,131,782 A * | 7/1992 | Bruno et al. | 403/359.5 X |
| 5,230,658 A | 7/1993 | Burton | |
| 5,243,874 A * | 9/1993 | Wolfe et al. | |
| 5,320,579 A | 6/1994 | Hoffmann | |
| 5,582,546 A | 12/1996 | Welschof | |
| 5,716,156 A * | 2/1998 | Bayer et al. | 403/359.6 X |
| 5,836,825 A | 11/1998 | Yamane | |
| 5,944,612 A | 8/1999 | Schwarzler | |
| 6,033,311 A | 3/2000 | Bartlett | |
| 6,071,195 A | 6/2000 | Krude | |
| 6,171,196 B1 | 1/2001 | Welschof | |
| 6,210,282 B1 | 4/2001 | Hofmann | |
| 6,234,908 B1 | 5/2001 | Jacob | |
| 6,251,019 B1 | 6/2001 | Hofmann et al. | |
| 6,251,021 B1 | 6/2001 | Jacob | |
| 6,254,487 B1 | 7/2001 | Jacob | |
| 6,261,184 B1 | 7/2001 | Jacob et al. | |
| 6,299,544 B1 | 10/2001 | Schwarzler et al. | |
| 6,350,205 B1 | 2/2002 | Kuhnhold et al. | |
| 6,371,859 B1 | 4/2002 | Gibson | |
| 6,543,266 B1 | 4/2003 | Jaekel | |
| 6,585,602 B2 | 7/2003 | Cermak et al. | |
| 7,008,327 B2 * | 3/2006 | Kuczera et al. | |
| 2002/0032065 A1 * | 3/2002 | Suzuki et al. | |
| 2003/0078107 A1 | 4/2003 | Margerie | |

FOREIGN PATENT DOCUMENTS

GB        1 327 952        8/1973

* cited by examiner

*Primary Examiner*—Greg Binda
(74) *Attorney, Agent, or Firm*—Jennifer M. Brumbaugh; Mick A. Nylander

(57) ABSTRACT

A telescoping propeller shaft includes an elongated hollow cylindrical body having a splined interior surface, the splines defining a minor diameter (x) and a major diameter (y), and a correspondingly splined shaft mating in register with the cylindrical body along an engagement length (L). Major (c) and minor (b) diameters of the splined shaft are less than the respective major (y) and minor (x) diameters of the interior splines of the cylindrical body such that the two shafts can freely telescope at least along the engagement length (L) and a free plunge region (D1). In response to a sufficient inward axial load, the cylindrical body is adapted to telescope over the splined shaft through an interference region (D2) comprising an interference mechanism for energy dissipation.

10 Claims, 5 Drawing Sheets

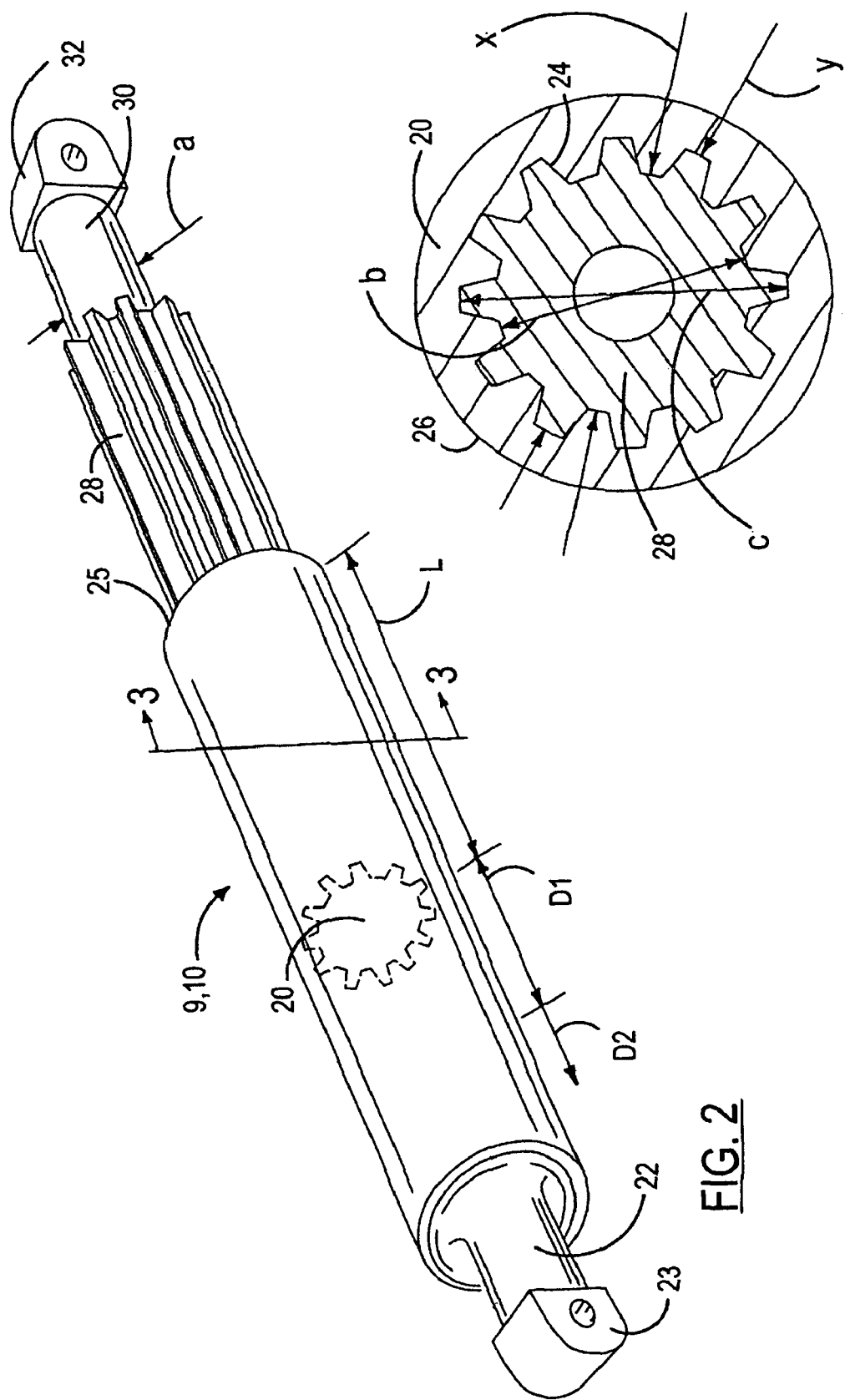

PROPSHAFT WITH CRASH-WORTHINESS

TECHNICAL FIELD

The present invention relates generally to motor vehicle propeller shafts, and more particularly concerns a propeller shaft having improved crash-worthiness.

BACKGROUND

Constant velocity (CV) joints are common components in automotive vehicles. Typically, CV joints are employed where transmission of a constant velocity rotary motion is desired or required. Common types of constant velocity joints are a plunging tripod, a fixed tripod, a plunging ball joint and a fixed ball joint. These types of joints are currently used in front wheel drive vehicles, or rear wheel drive vehicles, and on the propeller shafts found in rear wheel drive, all wheel drive, and four wheel drive vehicles.

Propeller shafts are also commonly used in motor vehicles to transfer torque from a front drive unit to a rear axle such as in rear wheel and all wheel drive vehicles. Propeller shafts are also used to transfer torque and rotational movement to the front axle in four wheel drive vehicles. In particular, two-piece propeller shafts are commonly used when large distances exist between the front drive unit and the rear axle of the vehicle.

Besides transferring mechanical energy, it is desirable for propeller shafts to have adequate crash-worthiness. In particular, it is desirable for the propeller shaft to be shortened axially to prevent it from buckling, penetrating the passenger compartment, or damaging other vehicle components in close proximity of the propeller shaft. In many crash situations, the vehicle body shortens and deforms. As a result, it is desirable that the vehicle propeller shaft be able to reduce in length during the crash, at or below a specified load. It is further desirable for the propeller shaft to absorb a considerable amount of the deformation energy during the crash. Thus, it is desirable that a mechanism be provided for permitting the propeller shaft to collapse under appropriate loads without compromising the driveline performance under normal operating conditions.

SUMMARY OF THE INVENTION

In one embodiment, a propeller shaft for a vehicle is provided which includes an elongated hollow cylindrical body having a splined interior surface, the splines defining a minor diameter (x) and a major diameter (y), and a correspondingly splined shaft mating in register with the cylindrical body along an engagement length (L). Major (c) and minor (b) diameters of the splined shaft are less than the respective major (y) and minor (x) diameters of the interior splines of the cylindrical body such that the two shafts can freely telescope at least along the engagement length and a free plunge region (D1). In response to a sufficient inward axial load, the cylindrical body is adapted to telescope over the splined shaft through an interference region (D2) comprising an interference mechanism for energy dissipation. The interference mechanism can include increasing the minor (b) or major (c) spline diameter of the splined shaft and/or decreasing the minor (x) or major (y) spline diameter of the cylindrical body. Other interference mechanisms include upstruck members formed in at least one spline groove of either or both of the cylindrical body or splined shaft. Helical splines can also be used in the interference region (D2) for energy dissipation.

In another embodiment, the invention provides a propeller shaft for a vehicle having an elongated hollow cylindrical body including a splined interior surface along at least an engagement length (L) thereof, and a correspondingly splined shaft mating in register with the cylindrical body along the engagement length (L). Major (c) and minor (b) diameters of the splined shaft are less than respective major (y) and minor (x) diameters of the interior splines of the cylindrical body, and the splined shaft includes a stub shaft at a connecting end thereof. A diameter (a) of the stub shaft is less than the splined shaft minor diameter (b) such that, in response to an inward axial load, the cylindrical body telescopes over the splined shaft including the stub shaft portion. Interference mechanisms may also be provided in an interference region (D2) beyond the engagement length (L).

In another embodiment of the invention, a method of making a propeller shaft is provided. The method includes providing an elongated hollow cylindrical body, and forming a splined interior surface on the cylindrical body, the splines defining a minor spline diameter (x) and a major spline diameter (y). The method also includes forming a splined shaft for mating in register with the cylindrical body along an engagement length (L). The splined shaft includes major (c) and minor (b) spline diameters that are less than the respective major (y) and minor (x) spline diameters of the interior splines of the cylindrical body. The method also includes forming an interference region (D2) beyond the engagement length (L) in either of the cylindrical body or splined shaft, the interference region (D2) comprising an interference mechanism for energy dissipation when the cylindrical body telescopes over the splined shaft through the interference region (D2) in response to an inward axial load. The interference mechanism may include forming helical splines or upstruck members within the spline grooves of either the splined shaft or cylindrical body. The spline diameters of the splined shaft or the cylindrical body, in the interference region (D2) may also be modified to provide energy dissipating capability during a crash event resulting in a sufficient axial load.

The present invention itself, together with further defined features, will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 2 shows a perspective view of a propeller shaft according to one embodiment of the present invention;

FIG. 3 shows a cross-sectional view of the propeller shaft of FIG. 2 along section line 3-3;

DETAILED DESCRIPTION

In the following description, various operating parameters and components are described for several constructed embodiments. These specific parameters and components are included as examples and are not meant to be limiting. Also, while the invention is described with respect to a propeller shaft having improved crash-worthiness within a vehicle driveline, the following apparatus is capable of being adapted for various purposes including automotive vehicles, motor systems that use a shaft, or other vehicles and non-vehicle applications that require collapsible shaft assemblies.

Figure 1:
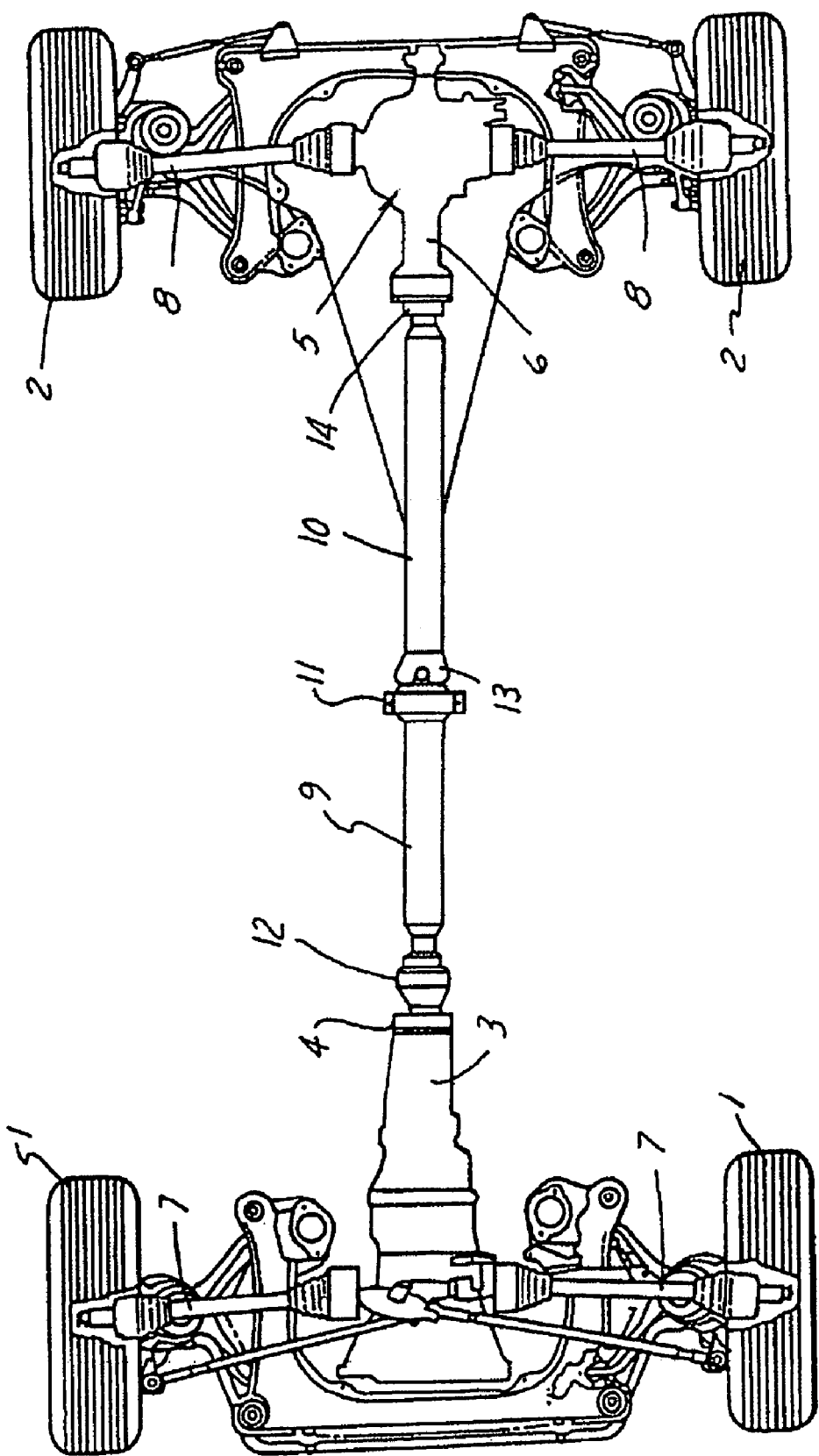
FIG. 1 shows a plan view of a vehicle driveline having a propeller shaft assembly.

Referring now to the drawings wherein like reference numerals are used to identify like components of the various views, FIG. 1 illustrates a diagrammatic view of an exemplary driveline of a motor vehicle having a propeller shaft assembly in which the present invention may be used to advantage. The driveline assembly of FIG. 1 is illustrative of the environment in which a propeller shaft in accordance with the present invention may be used. Other driveline layouts may also be improved by use of the propeller shaft disclosed herein, including single unit propeller shaft arrangements or multi-section propeller shaft arrangements for rear wheel drive or four-wheel drive vehicles. The shaft in accordance with the present invention may also be used in side shaft assemblies, or in non-automotive torque shaft applications.

In the example of FIG. 1, there is shown a driveline for a four-wheel drive vehicle. Two front wheels 1 and two rear wheels 2 are driven. FIG. 1 also shows a gear box 3 with a gear box output 4. In the region of a rear axle, there is provided an axle drive 5 with a drive input 6. The two front wheels 1 are driven by side shafts 7. The two rear wheels 2 are driven by the side shafts 8, starting from the axle drive 5. A propeller shaft assembly that comprises first and second propeller shaft portions 9, 10 provides the connection between the gear box 3 and the axle drive 5. The propeller shaft assembly is additionally supported on the floor assembly of the vehicle by an intermediate bearing 11, which, in this example, is arranged approximately centrally. The intermediate or center bearing 11 can also be a center bearing tuned absorber, i.e., a dynamic damper.

In the first propeller shaft portion 9, the propeller shaft assembly includes a first rotary joint 12 arranged near the gear box output 4. For connecting the two propeller shaft portions 9, 10, there is provided a second rotary joint 13. At the end of the second propeller shaft portion 10, there is arranged a third rotary joint 14 that, via a connecting mechanism, is connected to the drive input 6 of the axle drive 5 in the region of the rear axle. The rotary joints 12, 13, 14 may be Cardan joints or any one of several types of constant velocity joints such as a plunging tripod, a cross-groove joint or fixed joint, a fixed tripod joint or a double-offset joint. In this example, all three joints 12, 13, 14 are constant velocity fixed joints. In most applications, the propeller shaft portions 9, rotate at a speed which is higher than the speed introduced by the engine into the manual or automatic gear box. The reduction of the speed of the rear wheels 2 takes place in the axle drive 5. Whereas, for example, the propeller shaft assembly with the propeller shaft portions 9, 10 and the associated the joints 12, 13, 14 may be required to rotate at speeds of up to 10,000 revolutions per minute, the speeds of the side shafts 8 for driving the rear wheels 2 may only reach approximately up to 2,500 revolutions per minute.

Thus, the driveline assembly of FIG. 1 is a multi-sectional propeller shaft driveline assembly including two propeller shaft portions 9, 10, at least one of which is a propeller shaft having improved crash-worthiness in accordance with the present invention. The present invention may also be used in front-wheel drive, all-wheel drive, rear-wheel drive or other four-wheel drive driveline configurations. The propeller shaft of the present invention can also be used in driveline assemblies having a singular propeller shaft (omitting the second joint 13), or propeller shaft assemblies having more than two propeller shaft portions.

FIGS. 2 and 3, respectively, show a partial perspective view of a propeller shaft according to one embodiment of the present invention, and a cross-sectional view of the propeller shaft of FIG. 2 taken along line 3-3. The propeller shaft 9, 10 includes a female element in the form of a hollow tubular body 20. The tubular body 20 is made of steel. The tubular body 20 includes a stub shaft 22 at one end thereof with an appropriate connection mechanism 23. The stub shaft 22 is sealingly fixed at one end of the tubular body 20. The connection mechanism 23 may be one part of a Cardan joint, or a splined shaft for connecting to an inner joint part of a constant velocity joint or the like. The connection mechanism 23 will depend upon the particular application for the propeller shaft 9, 10 and all known connection mechanisms are contemplated by the present invention. The tubular body 20 has an interior surface 24 and an exterior surface 26. The tubular body 20, at the end opposite the stub shaft 22, includes an opening 25 for receiving a male element in the form a splined shaft 28.

The splined shaft 28, likewise, includes a stub shaft 30 and connection mechanism 32 for securing this end of the propeller shaft to an appropriate joint or driveline component. The splined shaft 28 may be hollow as shown, or may be solid. The hollow tubular body or female element 20 includes corresponding splines such that the splined shaft 28 can plunge with minimal resistance, at least for a short distance, with respect to the female element 20.

Under normal operating conditions, the male and female elements 28, 20 engage along at least a minimal engagement length, L. For deeply splined shafts, this distance may represent less than half of the total length of the propeller shaft 9, 10, whereas in other applications requiring less plunging capability or more rigidity, the engagement length, L may exceed half of the entire length of the propeller shaft 9, 10. Further, under normal operating conditions, the propeller shaft is intended to provide only a minimal amount of axial plunge. In a crash event resulting in an inward axial load, however, the male and female elements 28, 20 are intended to freely plunge for at least a minimum distance, D1. Thereafter, for a second distance, D2, (also referred to as an interference region) some interference elements may be included such that the propeller shaft 9, 10 provides an energy absorbing capability and a controlled failure during a crash event. The interference elements will be described in more detail below with respect to FIGS. 6-9.

Figure 4A:
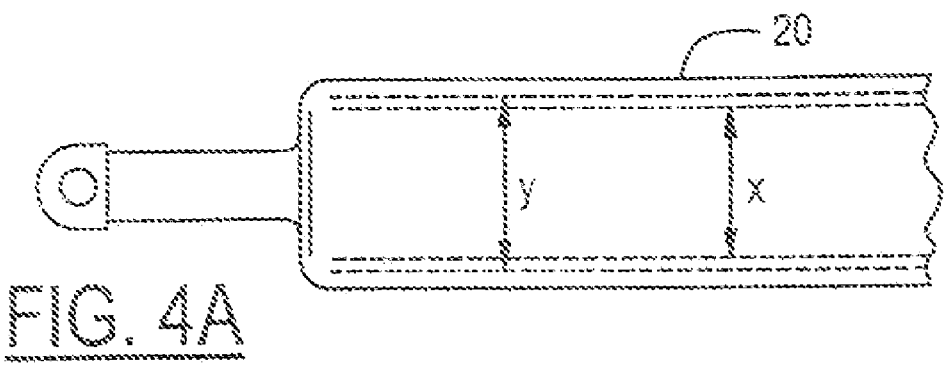
FIG. 4A shows a partial side view the female element of the propeller shaft of FIG. 2.
Figure 5:
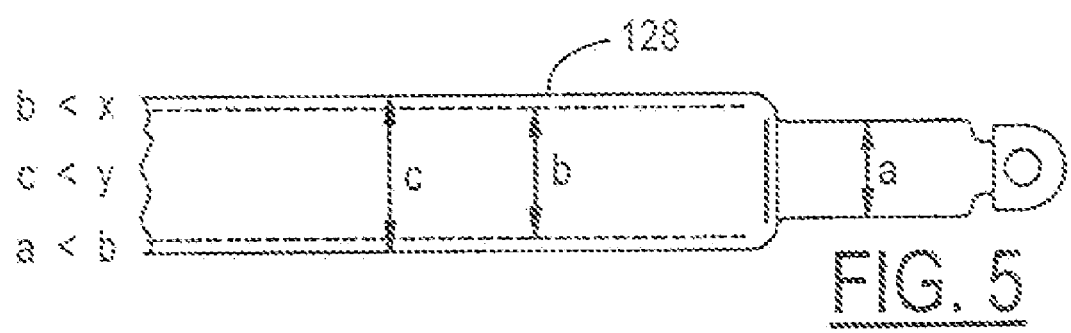
FIG. 5 shows a partial side view of a male element of the propeller shaft of FIG. 2.

FIGS. 3, 4A and 5 show the spline arrangement of the male element 28 and female element 20 which provides for the free plunge aspect of the propeller shaft 9, 10 along at least the engagement length (L) and free plunge first distance (D1). Specifically, the minor diameter (b) of the male element 28 is less than the minor diameter (x) of the female element 20, and the major diameter (c) of the male element 28 is less than the major diameter (y) of the female element 20. In applications where a complete collapse of the entire propeller shaft is desired in response to an inward axial load, the tube diameter (a) of the male element 28 can also be less than the minor spline diameter (b) of the male element 28 such that the entire male element 28 can be accommodated within the entire length of the female element 20.

Figure 4B:
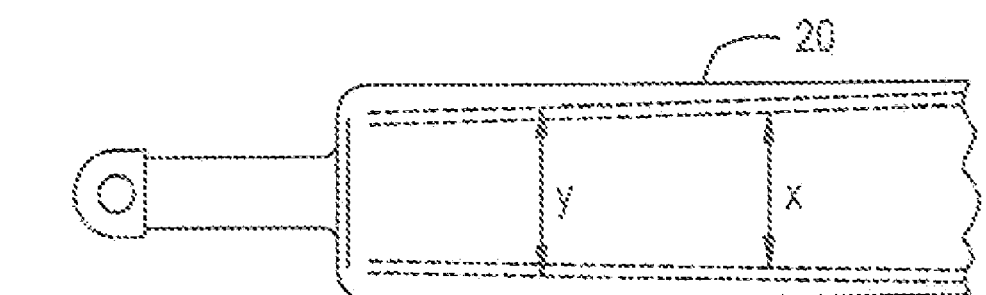
FIG. 4B shows a modified embodiment of the female element of FIG. 4A.

FIG. 4B shows a modified embodiment of the female element of FIG. 4A wherein the minor diameter (x) and major diameter (y) of the female element decrease along the length of the cylindrical body.

Figure 6:
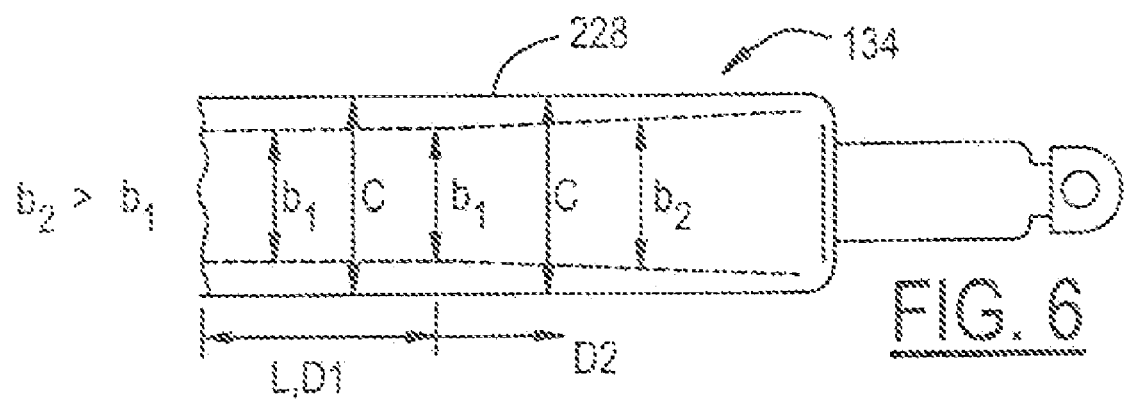
FIG. 6 shows another embodiment of a male element for a propeller shaft according to the present invention.
Figure 7A:
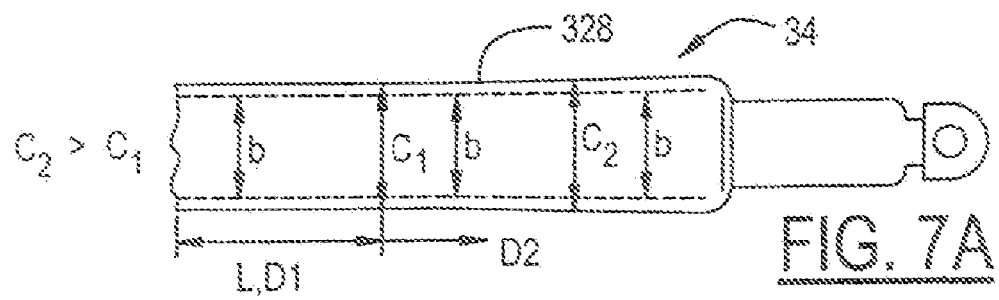
FIG. 7A shown a further embodiment of a male element for a propeller shaft according to the present invention.
Figure 7B:
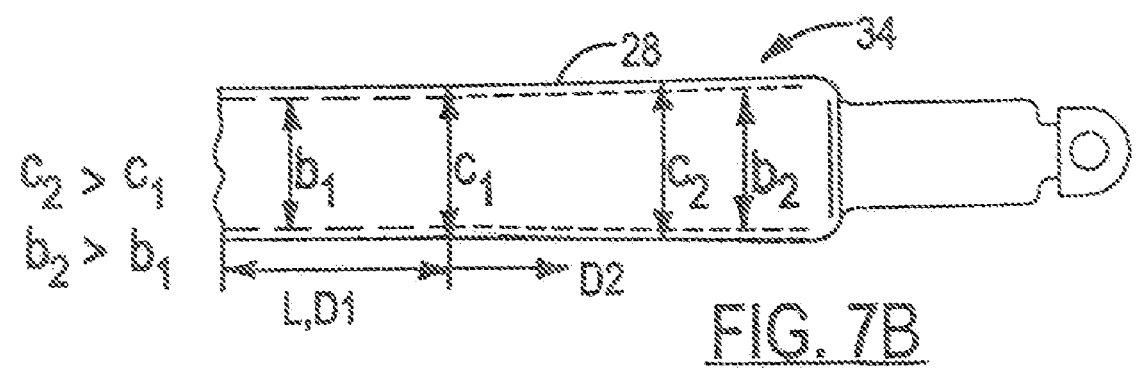
FIG. 7B shows a modified embodiment of the male element of FIG. 7A.
Figure 8:
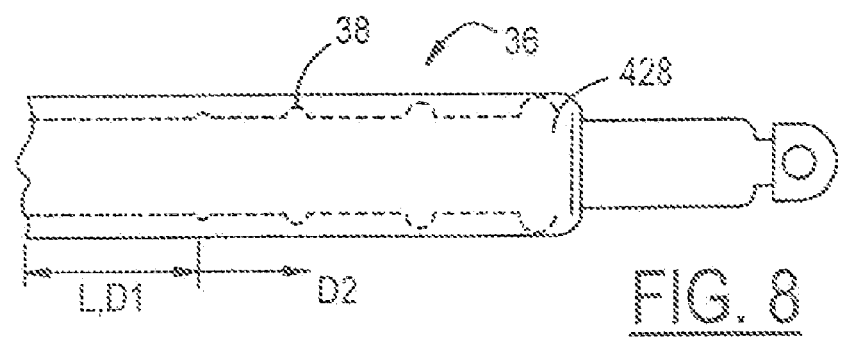
FIG. 8 shows a still further embodiment of a male element for a propeller shaft according to the present invention.

FIGS. 6-8 show alternative embodiments for the male element to provide for a desired amount of energy dissipation during a crash event, as well as a controlled failure or collapse of the propeller shaft. For example, FIG. 6 shows another embodiment of a male element for a propeller shaft according to the present invention wherein the minor diameter (b1) of the male element 128 is constant along the engagement length (L) and free plunge distance (D1), if any, with respect to the female element 20. After the desired free plunge distance (D1), the minor diameter (b1) of the male element splines increases in a ramped or stepped manner towards the stub shaft 30 portion of the male element 128. Thus, as shown in FIG. 6, the increased minor diameter (b2) is greater than the minor diameter (b1) in the engagement length (L) and free plunge distance (D1). As a result, the minor diameter (b2) of the male element 28 increasingly interferes with the minor diameter (x) of the female element 20 to provide energy dissipation for a second distance (D2). In the example of FIG. 6, however, the major diameter (c) of the male element 128 remains constant, and is less than the major diameter (y) of the corresponding female element 20, as in FIGS. 2-5.

FIG. 7 shows another embodiment of a male element for a propeller shaft according to the present invention wherein the major diameter (c1) of the male element 228 is constant along the engagement length (L) and free plunge distance (D1), if any, with respect to the female element. After the desired free plunge distance (D1), the major diameter (c1) of the male element splines increases in a ramped or stepped manner towards the stub shaft portion of the male element 228. Thus, as shown in FIG. 7, the increased major diameter (c2) is greater than the major diameter (c1) in the engagement length (L) and free plunge distance (D1). As a result, the major diameter (c2) of the male element 228 increasingly interferes with the major diameter (y) of the female element to provide energy dissipation for a second distance (D2). In the example of FIG. 7, however, the minor diameter (b) of the male element 228 remains constant, and is less than the minor diameter (x) of the corresponding female element, as in FIGS. 2-5. FIG. 7, thus differs from FIG. 6 in that the major diameter (c) of the male element splines increase along the plunging length (D2) while the minor diameter (b) is held constant whereas, in FIG. 6, the minor diameter (b) of the male element splines increased along the plunging length (D2) while the major diameter (c) is held constant.

The increasing minor diameter splines or major diameter splines are referred to herein as interference mechanisms 34. For sake of simplicity, FIG. 6 and FIG. 7 each show a male element with on interference mechanism 34, but it is to be understood that both could be employed in a propeller shaft according to the present invention (see FIG. 7B). Thus, both the minor diameter (b) and the major diameter (c) of the male element can increase along the energy dissipating length (d2) of the propeller shaft element.

Similarly, both interference mechanisms 34, 134 can be included in the female element 20 alternatively, or in addition to the male element 28, 128, 228 interference mechanisms. Thus, the minor diameter (x) and major diameter (y) of the female element 20 can decrease along the energy dissipating length (D2) of the propeller shaft. For increasing energy dissipation, these interference mechanisms 34, 134 can be used in combination with either or both of an increasing minor diameter (b) and major diameter (c) for the male element.

FIG. 8 shows another example of an interference mechanism 36 contemplated by the present invention which may be included in either the female element 20 or the male element 328. In this example, only the male element 328 is shown, it being understood that the same feature could be used on the spline grooves of the female element 20. The interference mechanisms comprise a series of upstruck members 38. These members 38, during a plunging event beyond the free plunge length (L, D1) will interfere with the minor diameter (x) of the female element 20. The diameter, axial length, number and spacing of the upstruck members 38 will depend upon the particular application under consideration. For more energy dissipation as the propeller shaft collapses during a crash event, the upstruck members 38 can increase in diameter as shown in FIG. 8. The upstruck members 38 can also be a constant size, and have variable or constant axial spacing. They can be annular such that they go around the entire circumference of the shaft 328 within every spline formed by the minor diameter (b), or they may be spaced, for example, in every other groove and increase in number along the plunge length (D2). Thus, they can be in one groove on the male element 328 or on multiple grooves on the male element 328. The upstruck members 38 may also be formed of a different material, such as a softer aluminium such that they can be readily deformed during an impact event requiring an axial shortening of the propeller shaft.

Figure 9:
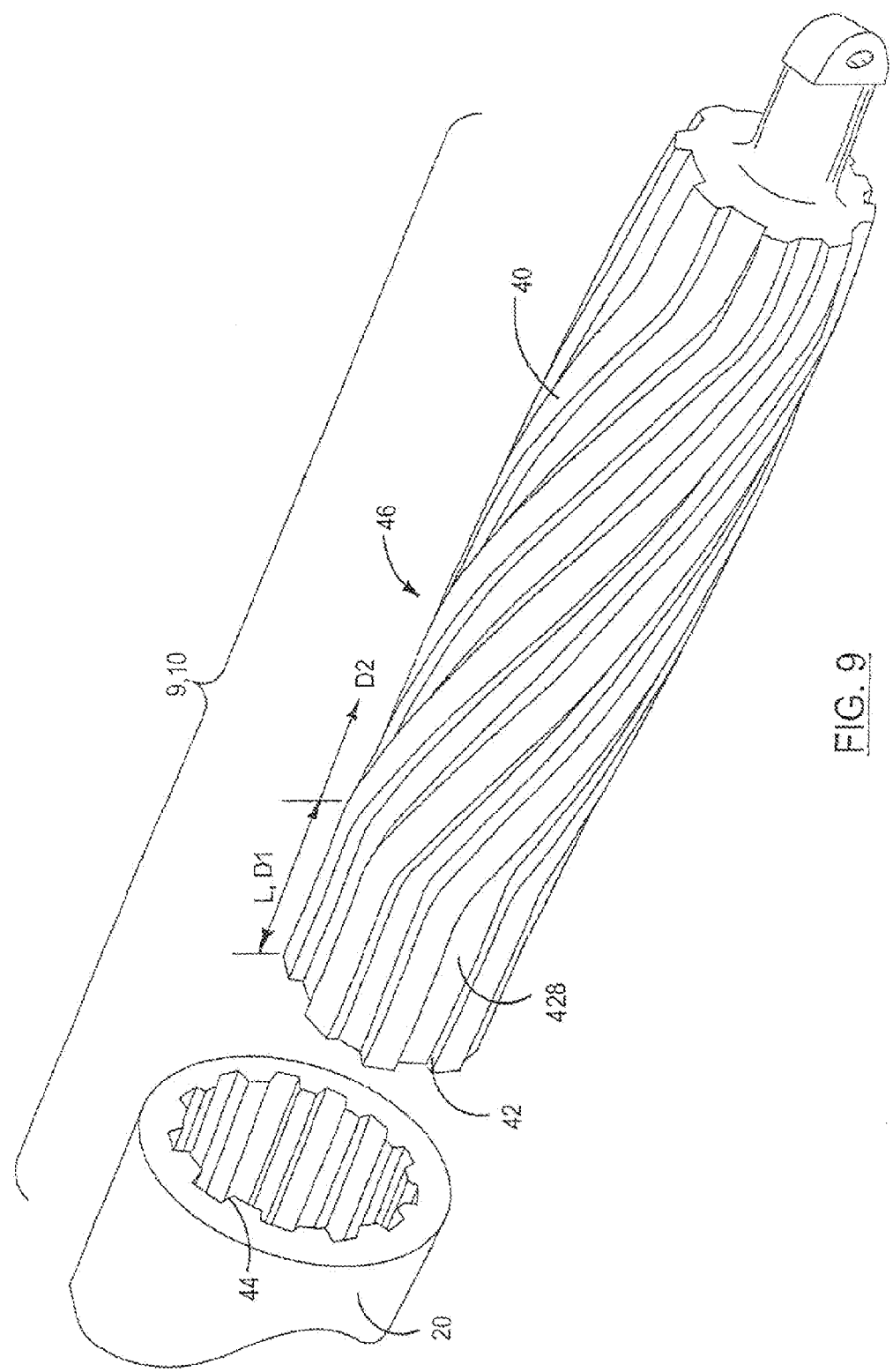
FIG. 9 shows a perspective view of another embodiment of a propeller shaft in accordance with the present invention.

FIG. 9 shows a perspective view of another embodiment of a propeller shaft 9, 10 having an energy dissipating crash feature in accordance with the present invention. In this example, the splines 40 of the male element 428 are provided in a helical pattern in the interference plunging region D2 to form an interference mechanism 46. Thus, along the engagement length (L) and free plunge distance (D1), the male element 428 and female element 20 are the same as shown in FIG. 2. The splines 40 are angled, however, with respect to the longitudinal axis of the male element 428 in the region where interference is desired during a crash-induced plunging event. In this way, the flanks 42 of the male element splines 40 will interfere with the flanks 44 formed in the interior of the female element 20. The splines of the female element 20 are straight, as in the previous figures. The amount of angular deviation will dictate the amount of interference and, hence, energy dissipation provided during an axial shortening within the interference region D2. It is contemplated that such helical splines could also be provided on the female element 20, although it may be easier to manufacture such splines on the male element 428.

Thus, in operation, the embodiments of FIGS. 6-9 all provide an engineered amount of energy dissipation in the event of a sufficient inward axial load. In each case, the interference mechanisms provide a constant or increasing energy dissipation as the propeller shaft 9, 10 is axially shortened along the interference plunging length D2. In this way, the likelihood of the propeller shaft 9, 10 interfering with the crash performance of the vehicle can be mitigated. The formation of the interference mechanisms 34, 134, 36, 46 in the interference region D2 can be designed such that the crash feature is activated only when a predetermined axial load has been exceeded. For example, the crash feature may be cold formed or hot formed depending upon the desired elasticity and fractureability of the resulting interference mechanism in the propeller shaft. Similarly, the profile of the interference mechanisms can be altered to provide a desired crash behavior for the overall shaft. The length of the interference region D2 can also vary depending upon the range of telescoping desired for the propeller shaft under consideration in the event of a sufficient axial load. In most cases, it is contemplated that the interference region D2 will comprise between 5 and 30% of the overall length of the propeller shaft.

A method of making the present propeller shaft includes providing an elongated hollow cylindrical body, and forming a splined interior surface on the cylindrical body, the splines define a minor spline diameter, x, and a major spline diameter, y. The method also includes forming a splined shaft for mating in register with the cylindrical body along an engagement length, L. The splined shaft includes major spline diameter, c, and minor spline diameter, b, that are less than the respective major spline diameter, y, and minor spline diameter, x, of the interior splines of the cylindrical body. The method also includes forming an interference region along second distance, D2, beyond the engagement length, L, in either of the cylindrical body or splined shaft, the interference region, D2, comprising an interference mechanism 34, 36 or 46 for energy dissipation when the cylindrical body telescopes over the splined shaft through the interference region, D2, in response to an inward axial load. The interference mechanism 34, 36 or 46 can include forming helical splines or upstruck members as discussed with reference to FIGS. 8 and 9, or increasing or decreasing the spline diameters as discussed with reference to FIGS. 6 and 7.

From the foregoing, it can be seen that there has been brought to the art a new and improved propeller shaft which has advantages over prior propeller shaft assemblies. While the invention has been described in connection with one or more embodiments, it should be understood that the invention is not limited to those embodiments. For example, a propeller shaft in accordance with the present invention may include more than one interference mechanism 34, 134, 36, 46. In addition, both the female element and the male element can include any combination of interference mechanisms 34, 134, 36, 46. Thus, the invention covers all alternatives, modifications, and equivalents as may be included within the spirit and scope of the appended claims.

What is claimed is:

1. A propeller shaft for a vehicle comprising:
   an elongated hollow cylindrical body having a splined interior surface along at least an engagement length (L) thereof; and
   a correspondingly splined shaft mating in register with and directly contacting the cylindrical body along the engagement length (L), wherein major (c) and minor (b) spline diameters of the splined shaft are less than respective major (y) and minor (x) spline diameters of the cylindrical body, and wherein the splined shaft includes a stub shaft at a connecting end thereof, a diameter (a) of the stub shaft being less than the splined shaft minor diameter (b) such that, in response to an inward axial load, the cylindrical body telescopes over the splined shaft including the stub shaft portion,
   wherein the cylindrical body is adapted to telescope over the splined shaft along a free plunge region (D1) while being rotationally fixed with respect to each other such that the propeller shaft can transmit torque and, thereafter, telescope through an interference region (D2) comprising an interference mechanism for energy dissipation, and
   wherein the interference mechanism comprises an increasing minor spline diameter (b) of the splined shaft.

2. A propeller shaft according to claim 1 wherein the interference mechanism further comprises an increasing major spline diameter (c) of the splined shaft.

3. A propeller shaft according to claim 1 wherein the interference mechanism further comprises a decreasing minor spline diameter (x) of the cylindrical body.

4. A propeller shaft according to claim 1 wherein the interference mechanism further comprises a decreasing major spline diameter (y) of the cylindrical body.

5. A propeller shaft according to claim 1 wherein the interference region comprises between 5 and 30 percent of the length of the propeller shaft.

6. A telescoping propeller shaft comprising:
   an elongated hollow cylindrical body having a splined interior surface, the splines defining a minor spline diameter (x) and a major spline diameter (y); and
   a correspondingly splined shaft mating in register with and directly contacting the cylindrical body along an engagement length (L), wherein major (c) and minor (b) spline diameters of the splined shaft are less than the respective major (y) and minor (x) diameters of the interior splines of the cylindrical body, the engagement length defining a free plunge region (D1) permitting axial displacement of the shaft and cylindrical body while being rotationally fixed with respect to each other such that the propeller shaft can transmit torque,
   wherein, in response to an inward axial load, the cylindrical body is adapted to telescope over the splined shaft through an interference region (D2) comprising an interference mechanism for energy dissipation, and
   wherein the interference mechanism comprises an increasing major spline diameter (c) of the splined shaft.

7. A propeller shaft according to claim 6 wherein the interference mechanism further comprises an increasing minor spline diameter (b) of the splined shaft.

8. A propeller shaft according to claim 6 wherein the interference mechanism further comprises a decreasing minor spline diameter (x) of the cylindrical body.

9. A propeller shaft according to claim 6 wherein the interference mechanism further comprises a decreasing major spline diameter (y) of the cylindrical body.

10. A propeller shaft according to claim 6 comprising a constant velocity joint at an attachment end of either the cylindrical body or the splined shaft.

* * * * *